United States Patent
Höfele et al.

(10) Patent No.: US 11,928,203 B2
(45) Date of Patent: Mar. 12, 2024

(54) METHOD AND TEST ENVIRONMENT FOR PROVIDING AN APPLICATION FOR A COMPUTER CONTROLLED COMPONENT

(71) Applicant: Siemens Aktiengesellschaft, Munich (DE)

(72) Inventors: Markus Höfele, Mannheim (DE); Peter Kob, Heroldsberg (DE); Rolf Schrey, Mönchengladbach (DE); Armin Zeltner, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 859 days.

(21) Appl. No.: 16/929,466

(22) Filed: Jul. 15, 2020

(65) Prior Publication Data

US 2021/0019396 A1    Jan. 21, 2021

(30) Foreign Application Priority Data

Jul. 18, 2019  (EP) .................................... 19187039

(51) Int. Cl.
*G06F 21/53* (2013.01)
*G06F 9/455* (2018.01)
*G06F 11/36* (2006.01)

(52) U.S. Cl.
CPC .......... *G06F 21/53* (2013.01); *G06F 9/45558* (2013.01); *G06F 11/3664* (2013.01); *G06F 11/3688* (2013.01); *G06F 2009/45591* (2013.01)

(58) Field of Classification Search
CPC .. G06F 21/53; G06F 9/45558; G06F 11/3664; G06F 11/3688; G06F 2009/45591; G06F 21/554; G06F 11/3668; G06N 3/08
See application file for complete search history.

(56) References Cited

U.S. PATENT DOCUMENTS 7,299,452 B1*  11/2007  Zhang ................... G06F 40/129
                                          717/124
2015/0195181 A1*  7/2015  Birmiwal ................ H04L 41/22
                                          717/124
(Continued)

FOREIGN PATENT DOCUMENTS

CN         109656829          4/2019

OTHER PUBLICATIONS

EP Search Report dated Feb. 27, 2020 based on EP 19187039 filed Jul. 18, 2019.

*Primary Examiner* — Mohammad W Reza
(74) *Attorney, Agent, or Firm* — Cozen O'Connor

(57) ABSTRACT

A method for operating a cooling system of a transformer, wherein the transformer is cooled via a cooling liquid that circulates in the cooling system that includes a heat-exchanger, devices for increasing heat exchange performance of the at heat-exchanger and a controller, where in a normal operating state, the controller adjusts power of the devices for increasing the heat exchange performance as a function of a measured upper temperature and where, irrespective of the measured upper temperature, the controller refrains from activating the devices and/or operates the devices at a reduced power relative to the normal operating state if the lower temperature of the cooling liquid lies below a lower threshold value during operation of the transformer to achieve improved characteristics of the cooling system during operation under low environmental temperatures of the transformer, particularly in the case of a turn-on operation following lengthy storage in a cold state.

17 Claims, 2 Drawing Sheets

(56) References Cited

U.S. PATENT DOCUMENTS

2017/0344333 A1* 11/2017 Jin ...................... G06F 3/04845
2018/0307590 A1* 10/2018 Padhi ................... G06V 30/416
2019/0156023 A1    5/2019 Gerebe et al.

* cited by examiner

METHOD AND TEST ENVIRONMENT FOR PROVIDING AN APPLICATION FOR A COMPUTER CONTROLLED COMPONENT

BACKGROUND OF THE INVENTION

1. Field of the Invention

The invention relates to a test environment and to a method for providing an application for a computer-controlled component.

2. Description of the Related Art

Application programs, i.e., software executable by computers, particularly those for industrial applications and the like, referred to as applications for short, are increasingly offered via "app stores", which are program servers ("repositories"), normally from a multiplicity of providers who store applications and make them available for downloading. A common application scenario for application storage devices of this type involves providing applications for edge devices or industrial edge devices that are located at the interface between an automation network and a public data network (usually the Internet), and which, on the one hand, provide computing power for data processing in the automation network and, on the other hand, effect the exchange of usually preprocessed data between the automation network and the public network, in particular a cloud.

The edge devices, i.e., the components for running the applications, are often configured for the simultaneous running of a plurality of applications, which is generally effected via a container virtualization, i.e., through the processing of "docker containers".

In contrast to conventional, self-contained and encapsulated automation environments that are often planned and programmed by a single "one-stop shop" operator, the applications of numerous providers are made available via the application storage devices in present-day systems, which makes it more difficult to control the applications in terms of data security and the like. This is further exacerbated by the fact that the risk of unauthorized access and data transfers increases due to the connection of the components, i.e., particularly the edge devices, to the public network (Internet, cloud).

The applications are therefore intended to adhere to defined security requirements and data processing guidelines (referred to as "policies"), i.e., in the case of an application (app) made available via the application storage device, it is intended to be ensured that the application is checked before delivery (before being made available via the application storage device) to determine whether all components of the application are safe in terms of known security leaks and whether, above all, they adhere to predefine policies, i.e. rules for accessing data, communication interfaces, connected peripheral devices and the like.

For this purpose, it is known for the application, in particular "docker image files", i.e., encapsulated program packages or "containers", are checked for security leaks and are qualified with respect to the libraries that are used. This means that it is assumed in a rough approximation that, in the case where checked runtime libraries and the like are used, the application generated therewith is safe. Obviously, however, the use of certified libraries and the like does not in fact necessarily ensure that the application performs no unauthorized access.

SUMMARY OF THE INVENTION

In view of the foregoing, it is an object of the present invention to verify a rule-compliant behavior of applications for industrial components and, above all, to ensure this also occurs during runtime.

These and other objects and advantages are achieved in accordance with the invention by a method for providing an application for a computer-controlled component, in particular for an industrial edge device, where following its creation, the application is provided via an application storage device, in particular an app store, for the component. Prior to its provision, the application is run in a test environment, where a first characteristic dataset, in particular a fingerprint, a hash value, a profile file or a feature table, is formed during the running of the application in the test environment via interactions registered during the running of the application with or via the test environment, where the first dataset assigned to the application is provided via the application storage device, where the application and the first dataset are transferred to the component in order to run the application, where a second characteristic dataset is formed at least temporarily during the running of the application on the component via the interactions registered there of the application with or via the execution environment, and where, a malfunction is reported and/or the running of the application is stopped in the event of a deviation between the datasets that exceeds a predefined amount. With the method in accordance with the invention, it is possible to ensure, on the one hand, that an application meets predefined criteria in terms of its runtime behavior and, on the other hand, it is possible to ensure that the permitted behavior patterns of the application established in a test operation during the certification of the application do not deviate substantially in live operation (positive operation) also.

A core idea of the solution for achieving the objects in accordance with the invention is that an application is operated or run in a special test environment before publication (provision for productive operation), and that a fingerprint or the like of the behavior pattern and the data access is generated, and this fingerprint or the like is stored with the application in the application storage device. The data access patterns of the new application are thus known, where the patterns can also be verified more precisely during this test cycle in terms of their compliance with predefined rules/policies. The core idea of the solution further provides that a new fingerprint or the like is formed in a corresponding manner in runtime, i.e., in productive operation of the application, and that the fingerprints or the like generated respectively in test operation and in productive operation are compared with one another so that potential attacks (from outside) or malfunction (of the application itself) can be detected and reported. It should be understood an automatic shutdown or other preprogrammed response can also be implemented instead of a report. By defining a degree of a permitted deviation between the fingerprints or the like, a different sensitivity of the detection can be defined according to the intended use of the application. Different permitted deviations between the fingerprints can also be defined in each case for different aspects of the check, such as for access to the main memory, access to network interfaces or other communication methodologies or access to data points of connected controls.

It is also an object of the invention to provide a test environment for providing an application for a computer-controlled component, in particular for an industrial edge device, where the test environment comprises an encapsulated execution environment, i.e., a "sandbox", for the trial run of the application. The test environment is equipped with a monitoring device for registering interactions of the application with or via the test environment, where the monitoring device is configured to form a first characteristic dataset, in particular a (digital) fingerprint, a hash value, a profile file or a feature table, from the registered interactions, and where the test environment is configured to transfer the application and the first characteristic dataset to an application storage device following the trial running of the application and following the creation of the first characteristic dataset. The advantages already discussed with reference to the method can be achieved with this test environment.

In one advantageous embodiment, the test environment is an encapsulated runtime environment, in particular a "sandbox", because access to memory cells, registers or services, is particularly effectively monitored, registered and tracked in such execution environments. It can easily be determined, in particular, whether unauthorized interactions, i.e., for example, access to external data or the like, are or are not occurring. The test environment can, in particular, also be a virtual machine that simulates the component (execution environment) and its peripheral devices accessible by the application. It is thus possible to test and, where appropriate, certify applications for different target systems (personal computers, edge devices, industrial controls, Human Machine Interface (HMI) devices or embedded systems) with one and the same test environment, i.e., a "generic" hardware platform, by simply instantiating a suitable virtual machine.

In one advantageous embodiment, the characteristic dataset is intended to be as small as possible in order to simplify operation, but is intended to reflect the type and/or frequency of access to data of an industrial automation component connected to the component or of a different peripheral device, on the other hand, such that unwanted interactions are reliably distinguishable from permitted interactions. For this purpose, it is advantageously appropriate to subdivide interactions and other types of access into access classes and adjust the formation of the fingerprint or the characteristic dataset in each case separately, and in each case also define a permitted deviation, depending on the importance or vulnerability of an individual access class. The overall characteristic dataset is then advantageously formed from the partial datasets of the individual access classes.

The first characteristic dataset is advantageously stored together with the application in the application storage device, or is at least connected or linked to the application such that a common access is possible. The first characteristic dataset is advantageously protected against manipulation and the like by a digital certificate. In one advantageous embodiment, the digital certificate also extends over the application such that the application and the first characteristic dataset together form an inseparable, manipulation-proof unit. The integrity of the application and the characteristic dataset is advantageously verifiable via a public key infrastructure.

The first characteristic dataset is advantageously linked to information relating to the type and extent of the interactions to be registered and relating to the specific consideration of these interactions for the first and second datasets. This can be achieved, for example, via explicit rules (e.g., an XML file), or through the indication of a version regulation for the formation of the dataset or fingerprint or hash value. This offers the advantage of ensuring that the first dataset and the second dataset are each created according to the same rules and regulations, this being the basic prerequisite for the later comparison of the results. The first dataset can furthermore also contain information ("blacklist", "whitelist") relating to permitted or unauthorized or possibly even prescribed interactions, data access and the like, such that a malfunction can be detected more reliably and more quickly. This also makes it possible from the outset to automatically block corresponding ports, interfaces and the like on the side of the component, i.e., the test environment in productive operation, in the manner of a firewall, thus offering additional data security.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An example embodiment of the invention will be explained below with reference to the drawings, which simultaneously serves to explain a test environment in accordance with the invention, in which.

DETAILED DESCRIPTION OF THE EXEMPLARY EMBODIMENTS

Figure 1:
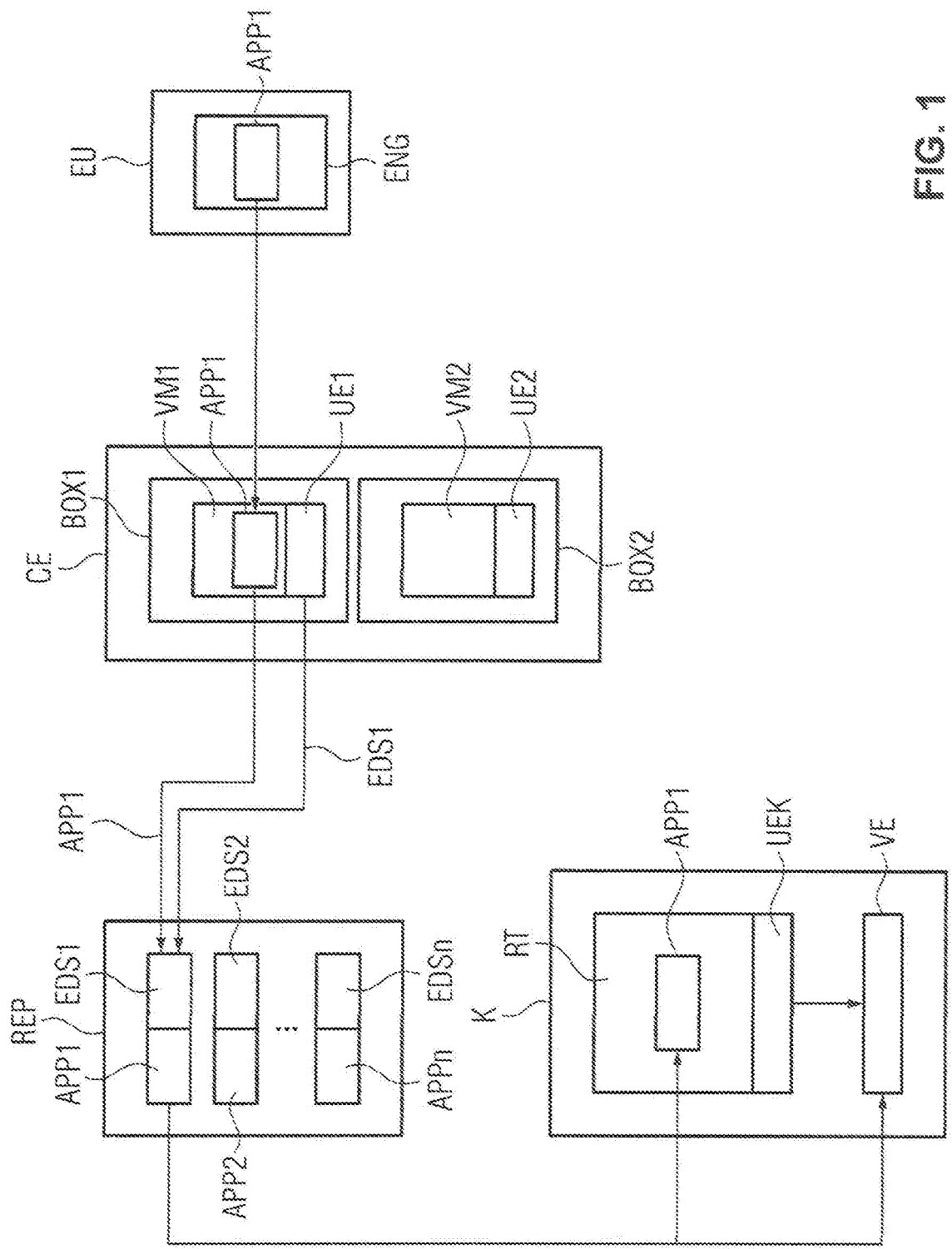
FIG. 1 is a schematic illustration of a network with an application storage device, a certification device, a development system for applications and a component as an execution environment for execution of an application in productive operation in accordance with the invention.

FIG. 1 shows a development environment EU, i.e., a workstation for the development of software. An engineering system ENG with which an application APP1 is created executes in the development environment EU. In the present case, the application APP1 is software for an industrial edge device which, as the component K in the figure, forms the target system for the application APP1. In the present example embodiment, the application APP1 is configured to collect and statistically evaluate production data from programmable logic controllers that can exchange data with the component K, and to transfer the production data to an external Supervisory Control and Data Acquisition (SCADA) system. However, for purposes of simplification, the industrial control and the SCADA system are not shown in FIG. 1.

FIG. 1 additionally shows a test environment CE ("certification environment") which consists in principle of a server on which different test environments BOX1, BOX2 are instantiated, wherein in the presently illustrated example, the test environments BOX1, BOX2 are virtual machines, of which the test environment BOX1 simulates a "docker engine", where the docker engine corresponds to a runtime environment RT of the component K. An industrial control is also simulated in the same way as a data source, just as the real industrial control also represents a data source for the component K. The test environment BOX1 is furthermore also configured to simulate a data sink in the manner of the described SCADA system. In an alternative embodiment, the test environment BOX1, BOX2 can also be embedded in a real environment, i.e., linked to a real control. This type of scenario is also referred to as hardware-in-the-loop (HIL).

The application APP1 is correspondingly a "docker container" that executes in the runtime environment RT in production operation, but is executed in the test environment BOX1 for a test and certification. The test environment BOX1 further comprises a logging function UE1 (monitoring engine) with which, inter alia, the data exchange of the application APP1 can be logged and evaluated during its operation in the test environment BOX1 with the simulated data sources and data sinks. The logging function UE1 is further configured, via the registered interactions of the application APP1, i.e., access to the data sources, transfers to the data sinks, internal memory accesses, library calls, accesses to (simulated) hardware resources, etc., to form a first characteristic dataset EDS1 and link it to the application APP1 and forward it to the application storage device REP (repository) upon completion of the test and certification.

In the overall illustrated system, the application storage device REP represents an app store with which the applications APP1, . . . , APPn can be made available for the component K and other components. It should be noted that other components may also be of a different type, and that different "suppliers" can provide the different applications APP1, . . . , APPn, possibly also on payment of a fee.

As previously explained, the component K shows a number of runtime environments RT for running docker containers, where only one runtime environment RT is shown. The runtime environment RT comprises or has access to a second monitoring device UEK that is configured in a manner similarly or identically to the monitoring device UE1 of the test environment BOX1. The monitoring device UEK is connected to a comparison device VE that is configured to compare the first characteristic dataset EDS1 with a second characteristic dataset (not shown) formed by the monitoring device UEK during productive running of the application APP1. The comparison device VE is programmed such that a warning is output in the event of an administrable, significant difference between the characteristic datasets, the running of the application APP1 is stopped or a different preprogrammed response is triggered.

The comparison device VE can also perform further monitoring functions, in particular a predefined blacklist or a predefined whitelist (or both) can be received and taken into account with the first characteristic dataset EDS1 or in a different manner, where the blacklist describes interactions of the application APP1 that are not allowed to be performed under any circumstances, and the whitelist prescribes interactions that are allowed to be performed or even must be performed without fail at least once or at regular time intervals or under specific conditions, such as calling a watchdog function.

The normal workflow in the illustrated system therefore assumes that the application APP1 is first programmed with the development system ENG. A blacklist or a whitelist can optionally also be defined, here. A permitted interaction pattern can further be defined during development or at a different time and by a different system or a different workstation, i.e., it is possible to define which data points of a subordinate programmable logic controller the application is permitted to access, how often and in what manner, which parameters are allowed to be transmitted to a data sink or to which memory areas or information access is permitted (and also in what manner and with what frequency). All of the last-mentioned information is made available to the monitoring device UE of the test environment BOX1, after which the application APP1 is made to execute in the test environment BOX1, specifically in the virtual machine VM1 formed there. The monitoring device UE1 comprises an algorithm that forms a characteristic dataset EDS1 from the registered interactions of the application APP1 during the test operation or the certification operation. A check value that is added with other check values to a hash value or key is generated from each registered or monitored interaction at least during the first call. It should be understood the frequencies of a call, the target of a call or of an interaction and the like can also have an effect on the formed first dataset EDS1. The registered interactions are presented on a separate workstation, such that the test engineer can establish whether only permitted interactions or also unauthorized interactions have been running, whereupon, in the case unauthorized interactions have been running, the application APP1 is recalled for review.

Following successful testing, the applications APP1 and the generated first dataset EDS1 are interlinked to form an archive file, this archive file is certified with a digital key so that the integrity of this data packet can be verified later, and is transferred into the application storage device REP and is therefore made available for use. This archive file or container is transferred for its use to the component K, where the part with the application APP1 is transferred productively into the runtime environment RT and the first characteristic dataset EDS1 is made available to the comparison device VE, where that part of the first characteristic dataset EDS1 that describes the interactions to be monitored and that further describes the algorithm according to which the second characteristic dataset is intended to be formed is fed to the second monitoring device UEK. The interactions of the application APP1 with the "environment", i.e., in general peripheral devices, communication connections or memories, in particular interactions with a subordinate industrial control and/or a data sink such as a SCADA system, are monitored by the monitoring device UEK during the runtime of the application APP1 in productive operation. A second characteristic dataset is duly generated and forwarded at regular intervals to the comparison device VE, where a check is performed in the comparison device VE to ascertain whether the actual runtime behavior deviates significantly or insignificantly from the certified runtime behavior during operation in the test environment BOX1.

In another embodiment, information relating to the runtime behavior, i.e., the registered interactions of the application APP1, is used to train a neural network, i.e., an artificial intelligence, where either automatically generated feedback and/or feedback from a monitoring workstation enables the neural network to be trained such that the neural network can distinguish between permitted and unauthorized interactions and behavior patterns.

The trained neural network can then be protected against further modifications and can finally be made available via provision, in particular by the application storage device REP, to the monitoring device UEK to monitor interactions, runtime behavior and access behavior of the application APP1 in productive operation. In this embodiment, the comparison device VE is configured to receive and process messages, in particular alarms due to unauthorized interaction behavior, and to instigate corresponding responses (messages or interruptions).

Figure 2:
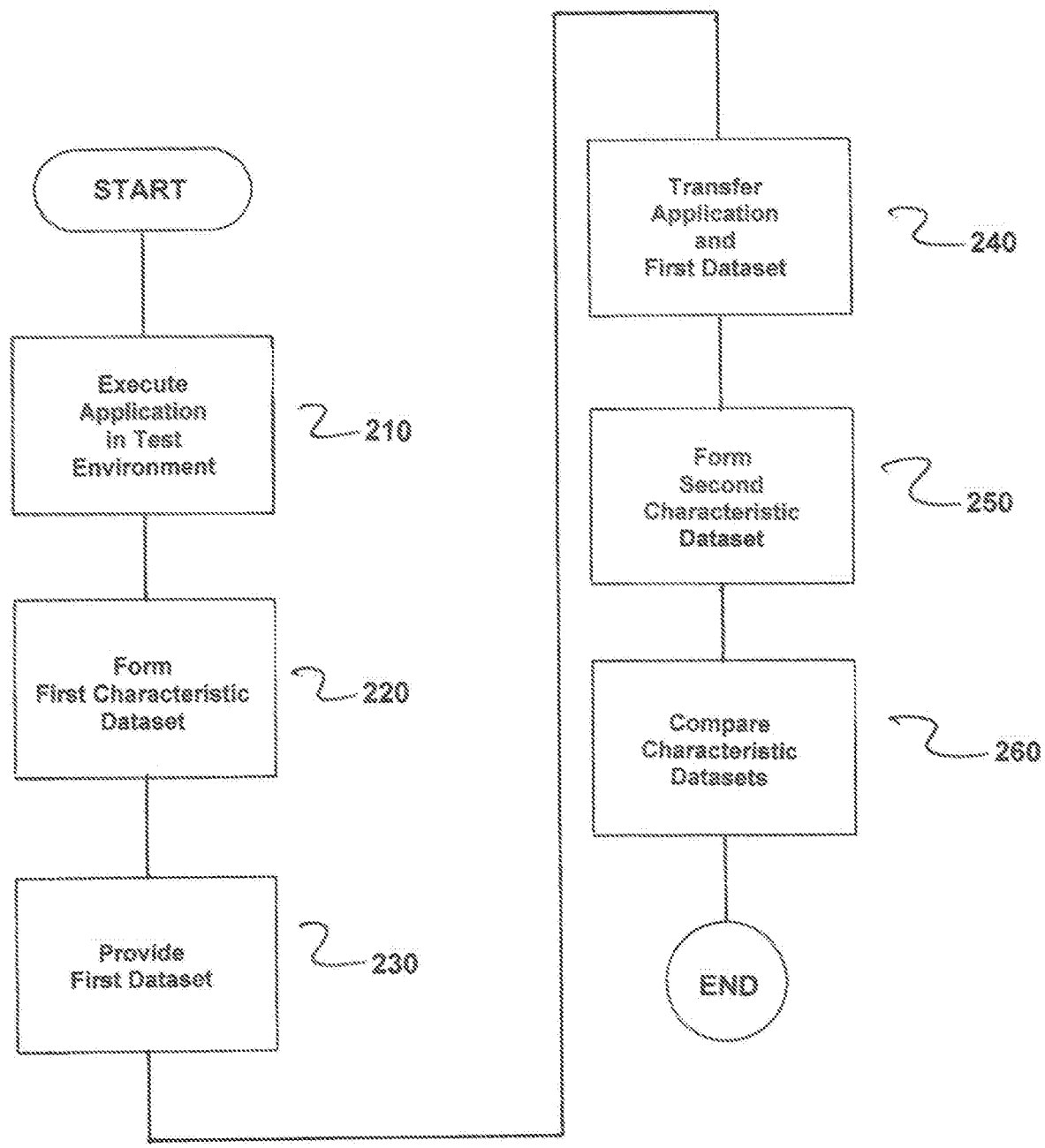
FIG. 2 is a flowchart of the method in accordance with the invention.

FIG. 2 is a flowchart of a method for providing an application APP1, . . . , APPn for a computer-controlled component K, where the application APP1, . . . , APPn is provided for the component K via an application storage device REP comprising an app store subsequent to creation of the application APP1, . . . , APPn.

The method comprises executing the application APP1, . . . , APPn in a test environment BOX1, BOX2 before providing the application APP1, . . . , APPn to the component K, as indicated in step 210.

Next, a first characteristic dataset EDS1 is formed during execution of the application APP1, . . . , APPn in the test environment BOX1, BOX2 via interactions with or via the test environment BOX1, BOX2 registered during execution of the application APP1, . . . , APPn, as indicated in step 220.

Next, the first dataset assigned to the application APP1, . . . , APPn is provided via the application storage device REP, as indicated in step 230.

The application APP1, . . . , APPn and the first dataset EDS1 are now transferred to the component K to execute the application APP1, . . . , APPn, as indicated in step 240.

Next, a second characteristic dataset is at least temporarily formed during execution of the application APP1, . . . , APPn in an execution environment RT of the component K via registered interactions of the application APP1, . . . , APPn with or via the execution environment RT, as indicated in step 250.

Next, the first and second characteristic datasets are compared with one another and either a malfunction is reported and/or execution of the application APP1, . . . , APPn is stopped in the event of a deviation between the first and second characteristic datasets which exceeds a predefined amount, as indicated in step 260.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing an application for a computer-controlled component, the application being provided for the component via an application storage device comprising an application store subsequent to creation of the application, the method comprising:
    executing the application in a test environment before providing said application to the computer-controlled component via the application storage device comprising the application store;
    forming a first characteristic dataset during the execution of the application in the test environment via interactions with or via the test environment registered during the execution of the application before providing said application to the computer-controlled component;
    providing the first characteristic dataset assigned to the application via the application storage device comprising the application store;
    transferring the application and the first characteristic dataset to the component to execute the application in a runtime execution environment of the computer-controlled component;
    forming a second characteristic dataset at least temporarily during execution of the application in the runtime execution environment of the computer-controlled component via registered interactions of the application with or via the runtime execution environment; and
    comparing the first and second characteristic datasets with one another and at least one of (i) reporting a malfunction and (ii) stopping the runtime execution of the application in an event of a deviation between the first and second characteristic datasets which exceeds a predefined amount.

2. The method as claimed in patent claim 1, wherein an encapsulated execution environment is utilized as the test environment.

3. The method as claimed in patent claim 1, wherein a virtual machine running on computer hardware is used for the test environment; and wherein the component is simulated by the virtual machine.

4. The method as claimed in patent claim 1, further comprising:
    documenting at least one of (i) a type and (ii) frequency of access to data of an indirectly or directly connected industrial automation component in each case by the application.

5. The method as claimed in patent claim 1, further comprising:
    storing the first characteristic dataset together with the application in the application storage device; and
    forwarding the first characteristic dataset and the application to the component via a common transfer procedure.

6. The method as claimed in patent claim 1, wherein the first characteristic dataset is protected against manipulations via a digital certificate.

7. The method as claimed in patent claim 1, wherein information relating to at least one of (i) a type and (ii) an extent of the interactions to be registered and their consideration for the first and second datasets is linked to the first characteristic dataset.

8. The method as claimed in patent claim 1, wherein the first characteristic dataset comprises information relating to unauthorized interactions.

9. The method as claimed in patent claim 1, wherein the computer-controlled component comprises an industrial edge device.

10. The method as claimed in patent claim 1, wherein the first characteristic dataset comprises one of (i) a fingerprint, (ii) a hash value, (iii) a profile file and (iv) a feature table.

11. The method as claimed in patent claim 2, wherein the encapsulated execution environment comprises a sandbox.

12. The method as claimed in patent claim 4, wherein the industrial automation component comprises an industrial control.

13. The method as claimed in patent claim 8, wherein the unauthorized interactions comprises at least one of (i) unauthorized accesses to data or functions of at least one of (i) the computer-controlled component and (ii) the peripheral devices connected to the computer-controlled component.

14. A system for providing an application for a computer-controlled component, the system comprising:
    a test environment for providing an application for a computer-controlled component, the test environment comprising:

an encapsulated execution environment for trial runs of the application; and a first monitoring device for registering interactions of the application with or via the test environment before providing said application to the computer-controlled component, the monitoring device being configured to form a first characteristic dataset from the registered interactions;

an application storage device comprising an application store, said application storage device providing the application to the computer-controlled component subsequent to creation of the application;

a second monitoring device for forming a second characteristic dataset at least temporarily during execution of the application in a runtime execution environment of the at least one computer-controlled component via registered interactions of the application with or via the runtime execution environment of the at least one computer-controlled component; and a comparison device for comparing the first and second characteristic datasets with one another and for at least one of (i) reporting a malfunction and (ii) stopping the runtime execution of the application in an event of a deviation between the first and second characteristic datasets which exceeds a predefined amount;

wherein the test environment is configured to, subsequent to a trial run of the application and subsequent to the formation of the first characteristic dataset, transfer the application and the first characteristic dataset to the application storage device comprising the application store.

15. The system as claimed in patent claim 14, wherein the computer-controlled component comprises an industrial edge device.

16. The system as claimed in patent claim 14, wherein the encapsulated execution environment comprises one of (i) a sandbox and (ii) a virtual machine.

17. The system as claimed in patent claim 14, wherein the first characteristic dataset comprises one of (i) a fingerprint, (ii) a hash value, (ii) a profile file and (iii) a feature table.

* * * * *

UNITED STATES PATENT AND TRADEMARK OFFICE
CERTIFICATE OF CORRECTION

| | | |
|---|---|---|
| PATENT NO. | : 11,928,203 B2 | Page 1 of 1 |
| APPLICATION NO. | : 16/929466 | |
| DATED | : March 12, 2024 | |
| INVENTOR(S) | : Höfele et al. | |

It is certified that error appears in the above-identified patent and that said Letters Patent is hereby corrected as shown below:

On the Title Page

Item (57) Replace the Abstract with the following:
-- A method and a test environment for providing an application for a computer-controlled component, wherein, following its creation, the application is provided via an application storage device for the component, the application being executed in a test environment before being provided, where during execution of the application in the test environment, a first characteristic dataset is formed via interactions with or via the test environment registered during execution of the application, where the first dataset assigned to the application is provided via the application storage device and where, during the execution of the application in an execution environment of the component, a second characteristic dataset is formed at least temporarily via registered interactions of the application with or via the execution environment, and where the first and the second characteristic dataset are compared with one another. --

Signed and Sealed this
First Day of April, 2025

Coke Morgan Stewart
*Acting Director of the United States Patent and Trademark Office*